(12) United States Patent
 Ye

(10) Patent No.: US 12,008,192 B2
(45) Date of Patent: Jun. 11, 2024

(54) DISPLAY PANEL, TOUCH TEST METHOD, AND ELECTRONIC DEVICE

(71) Applicant: Wuhan China Star Optoelectronics Semiconductor Display Technology Co., Ltd., Wuhan (CN)

(72) Inventor: Jian Ye, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/284,457

(22) PCT Filed: Feb. 25, 2021

(86) PCT No.: PCT/CN2021/077777
 § 371 (c)(1),
 (2) Date: Apr. 10, 2021

(87) PCT Pub. No.: WO2022/147892
 PCT Pub. Date: Jul. 14, 2022

(65) Prior Publication Data
 US 2024/0111378 A1  Apr. 4, 2024

(30) Foreign Application Priority Data
 Jan. 8, 2021  (CN) .......................... 202110022686.4

(51) Int. Cl.
 *G06F 3/041* (2006.01)
 *G06F 3/044* (2006.01)
 *G09G 3/00* (2006.01)

(52) U.S. Cl.
 CPC ........ *G06F 3/04164* (2019.05); *G06F 3/0412* (2013.01); *G06F 3/0443* (2019.05); *G09G 3/006* (2013.01); *G09G 2330/12* (2013.01); *G09G 2354/00* (2013.01)

(58) Field of Classification Search
 CPC .... G06F 3/0416–04186; G06F 3/0412; G09G 2330/12
 See application file for complete search history.

(56) References Cited

U.S. PATENT DOCUMENTS

| | | | |
|---|---|---|---|
| 10,311,766 B2 * | 6/2019 | Huang | G06F 3/0412 |
| 10,732,752 B1 * | 8/2020 | Zhu | G06F 3/0416 |
| 10,732,775 B2 * | 8/2020 | Kim | G06F 3/04166 |

(Continued)

FOREIGN PATENT DOCUMENTS

| | | |
|---|---|---|
| CN | 206039486 U | 3/2017 |
| CN | 106875879 A | 6/2017 |

(Continued)

*Primary Examiner* — Patrick F Marinelli
(74) *Attorney, Agent, or Firm* — Nathan & Associates; Menachem Nathan

(57) ABSTRACT

A display panel, a touch test method, and an electronic device are provided. The display panel includes a substrate, touch test terminals, a multiplexing circuit, touch units, and a touch display chip. Before the touch display chip is bonded to the display panel, the multiplexing circuit is configured to reduce a number of traces of the touch units connected to the touch test terminals to facilitate execution of a touch test. In addition, a number of the touch test terminals used is reduced, which can save space occupied by a frame.

18 Claims, 12 Drawing Sheets

(56) References Cited

U.S. PATENT DOCUMENTS

| | | | |
|---|---|---|---|
| 10,775,953 B2* | 9/2020 | Yeh | G06F 3/04164 |
| 11,145,561 B2* | 10/2021 | Ming | H01L 22/34 |
| 11,163,412 B2* | 11/2021 | Kim | G06F 3/0446 |
| 11,507,220 B2* | 11/2022 | Lius | A61B 5/1172 |
| 11,537,233 B2* | 12/2022 | Kwon | G01R 31/2829 |
| 11,675,466 B2* | 6/2023 | Kim | G06F 3/04164 |
| | | | 345/174 |
| 11,836,310 B2* | 12/2023 | Huang | G06F 3/044 |
| 2010/0115354 A1 | 5/2010 | Whetsel | |
| 2016/0364068 A1* | 12/2016 | Cheng | G06F 3/0412 |
| 2018/0284926 A1* | 10/2018 | Kim | G06F 3/04164 |
| 2018/0329544 A1* | 11/2018 | Yeh | G06F 3/04164 |
| 2019/0005861 A1* | 1/2019 | Huang | H01L 27/124 |
| 2020/0090567 A1* | 3/2020 | Lee | G09G 3/3266 |
| 2020/0333898 A1* | 10/2020 | Kim | G06F 3/0416 |
| 2021/0181916 A1* | 6/2021 | Kwon | G06F 3/0443 |
| 2021/0225216 A1* | 7/2021 | Wang | G06F 3/0443 |
| 2022/0019317 A1* | 1/2022 | Kim | G06F 3/0443 |
| 2023/0141463 A1* | 5/2023 | Huang | G02F 1/13338 |
| | | | 345/174 |
| 2023/0266853 A1* | 8/2023 | Kim | G06F 3/044 |
| | | | 345/174 |

FOREIGN PATENT DOCUMENTS

| | | | |
|---|---|---|---|
| CN | 107300793 A | 10/2017 | |
| CN | 107861658 A | 3/2018 | |
| CN | 108122804 A | 6/2018 | |
| CN | 111025793 A | 4/2020 | |
| CN | 111752413 A | 10/2020 | |
| WO | 2019052531 A1 | 3/2019 | |
| WO | 2020087819 A1 | 5/2020 | |

\* cited by examiner

DISPLAY PANEL, TOUCH TEST METHOD, AND ELECTRONIC DEVICE

FIELD OF INVENTION

This application relates to the field of touch display technology, and in particular to a display panel, a touch test method, and an electronic device.

BACKGROUND OF INVENTION

Organic light-emitting diode (OLED) displays have advantages of active light emission, large viewing angles, wide color gamut, high brightness, fast response times, less power consumption, and flexibility. They are increasingly becoming popular in the market and becoming a mainstream display technology.

Currently, most direct on-cell touch (DOT) solutions adopt a mutual capacitive touch screen design, where a touch integrated circuit (TIC) and a source driver IC (DIC) are two independent ICs. The DIC is usually located on a flexible substrate of an active-matrix organic light-emitting diode (AMOLED) display panel, and the TIC is located on a main flexible printed circuit board.

Because the mutual-capacitive touch screen has fewer touch channels, and touch traces (TP traces) connecting touch electrodes can be led out from upper, lower, left, and right frames of a screen body, so that in a cell state (i.e., in a state where the FPC is not yet bonded), all of the TP traces can be directly extended to a bonding area of the panel, and testing can be performed by means of FPC false pressure.

Compared with a traditional solution where TIC and DIC are two independent ICs, a technical solution where TIC and DIC are integrated into one chip (TDDI solution) means that TIC is integrated into the DIC and directly acts as an IC bonded on a flexible AMOLED substrate.

However, for self-capacitance DOT (S-DOT) TDDI technology, a touch electrode unit is of a point self-capacitance design. It contains hundreds or even thousands of touch electrode units, and each of them is respectively connected to a corresponding one of touch output pins of the TDDI IC through a corresponding TP trace. Moreover, a TP driver in the corresponding TDDI IC does not adopt a technical solution containing multiplexing circuits. That is, a number of point self-capacitance sensor units in the touch screen is consistent with a number of touch output pins in the TDDI IC.

For current display panels using S-DOT and TDDI technology, TP trace also needs to be connected to the touch output pin below the TDDI IC. In addition, with a large number of TP traces and limited layout space, it is impossible to lead out all the TP traces for a false pressure test. Therefore, how to perform a touch test in a cell state on a display panel using S-DOT and TDDI technology has become an urgent problem to be solved.

Technical Problem

The present application provides a display panel, a touch test method, and an electronic device, which solves the touch test problem of a display panel using S-DOT and TDDI technology in the cell state.

SUMMARY OF INVENTION

In the first aspect, the present application provides a display panel, which includes a substrate, touch test terminals, a multiplexing circuit, touch units, and a touch display chip. An input end of the multiplexing circuit is correspondingly connected to one of the touch test terminals. One of the touch units is correspondingly connected to an output end of the multiplexing circuit. One of touch output pins of the touch display chip is correspondingly connected to one of the touch units, wherein the touch test terminals and the multiplexing circuit are located between the substrate and the touch display chip, and the touch display chip at least partially overlaps the touch test terminals and/or the multiplexing circuit.

Based on the first aspect, in a first embodiment of the first aspect, the touch display chip includes N touch output groups. One of the touch output groups includes a plurality of touch output pins, where a distance between two adjacent touch output pins is defined as a first distance, a distance between two adjacent touch output groups is defined as a second distance, and the first distance is less than the second distance. The multiplexing circuit includes N multiplexing sub-circuits, where one of the multiplexing sub-circuits is vertically opposite to one of the touch output groups, and where N is an integer greater than or equal to 2.

Based on the first embodiment of the first aspect, in the second embodiment of the first aspect, the multiplexing sub-circuit includes a plurality of multiplexing units. The input end of a multiplexing unit is correspondingly connected to a touch test terminal.

Based on the second embodiment of the first aspect, in the third embodiment of the first aspect, the touch display chip includes input pins, a main body, and touch output pins, where the input pins and the touch output pins are respectively located on two opposite sides of the main body of the touch display chip. The display panel further includes input terminals and output terminals, one of the input pins is connected to one of the input terminals, and one of the touch output pins is connected to one of the output terminals, where the touch test terminal and the multiplexing circuit are located between the input terminals and the output terminals.

Based on the third embodiment of the first aspect, in a fourth embodiment of the first aspect, at least one row of the input terminals and at least three rows of the output terminals are disposed on the substrate.

Based on the fourth embodiment of the first aspect, in a fifth embodiment of the first aspect, the touch display chip further includes display output pins provided on the same side as the touch output pins. The display output pins are distributed between the touch output groups, where one of the display output pins is connected to one of the output terminals.

Based on the fifth embodiment of the first aspect, in a sixth embodiment of the first aspect, the display panel includes a display area and a frame area, where the frame area includes a bending area, and the bending area is close to the display area. The display panel further includes: a touch line group including touch traces, where one of the touch traces is correspondingly connected to one of the touch output pins or one of the output terminals; and a data line group including data lines, where one of the data lines is correspondingly connected to one of the display output pins or one of the output terminals; wherein the touch line group and the data line group are alternately distributed in sequence, and the touch line group and the data line group are located on one side of the bending area away from the display area.

Based on the sixth embodiment of the first aspect, in a seventh embodiment of the first aspect, the display panel further includes power supply line groups including power supply traces, where one of the power supply line groups is located between the touch line group and the data line group adjacent to the touch line group.

Based on the sixth embodiment of the first aspect, in an eighth embodiment of the first aspect, the display panel further includes touch lines, where one of the touch lines is connected to one of the touch traces and one of the touch unit, and where the touch lines are equally spaced in the display area and two ends of each of the touch lines are aligned with each other.

Based on the eighth embodiment of the first aspect, in a ninth embodiment of the first aspect, the touch unit includes touch electrodes arranged in a first metal layer, and the touch lines are located in the first metal layer and connected to the touch electrodes; or the touch unit includes a first metal layer provided with touch electrodes, a second metal layer provided with the touch lines, and an insulating layer located between the first metal layer and the second metal layer, where via holes are formed between the first metal layer and the second metal layer, and one of the touch electrodes is connected to one of the touch lines through at least one of the via holes.

Based on any of the foregoing embodiments of the first aspect, in a tenth embodiment of the first aspect, the display panel further includes multiplexing signal lines and multiplexing test terminals, where each of the multiplexing signal lines is electrically connected to a gate of corresponding one of the thin-film transistors in the multiplexing circuit, and one of the multiplexing signal lines is connected to at least one of the multiplexing test terminals.

Based on the tenth embodiment of the first aspect, in an eleventh embodiment of the first aspect, the multiplexing test terminals are located on one side of the thin-film transistor.

In a second aspect, the present application provides a touch test method for the display panel in any of the above embodiments, which includes: providing a touch test chip, the touch test chip includes test pins, one of the test pins is correspondingly connected to one of the touch test terminals, where multiplexing signal output by the touch test chip is configured to correspondingly control the multiplexing circuit; determining a corresponding control relationship between the multiplexing signal and the multiplexing circuit; connecting corresponding one of the test pins and one of the touch test terminals based on the corresponding control relationship; and performing a touch test before installing the touch display chip.

In a third aspect, the present application provides an electronic device, which includes the display panel in any of the foregoing embodiments.

This application provides a display panel, a touch test method, and an electronic device. Before bonding the touch display chip to the display panel, the multiplexing circuit is used to reduce the number of traces of the touch unit connected to the touch test terminal and reduce the number of touch test terminals used. All the traces of the touch unit can be extended to the touch test terminal to facilitate the touch test. In addition, the touch display chip at least partially overlaps the touch test terminal and/or the multiplexing circuit, which does not affect the subsequent installation of the touch display chip, and can save the space occupied by the frame.

DETAILED DESCRIPTION OF PREFERRED EMBODIMENTS

In order to make the purpose, technical solutions, and effects of the present application clear, the following further describes the present application in detail with reference to the drawings and embodiments. It should be understood that the specific embodiments described here are only used to explain the application, but not to limit the application.

Figure 1:
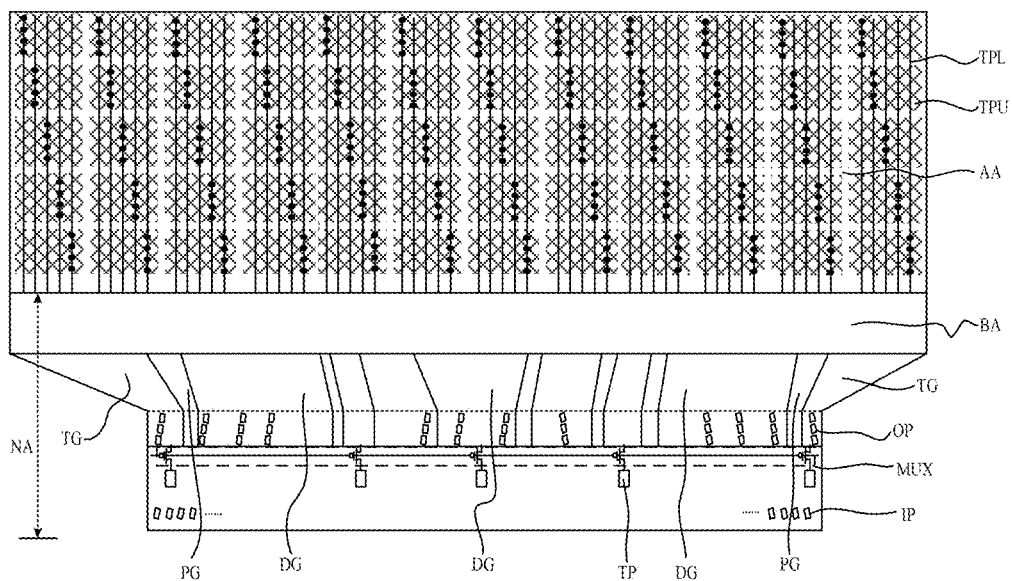
FIG. 1 is a schematic diagram of a first structure of a display panel provided by an embodiment of the present application.
Figure 2:
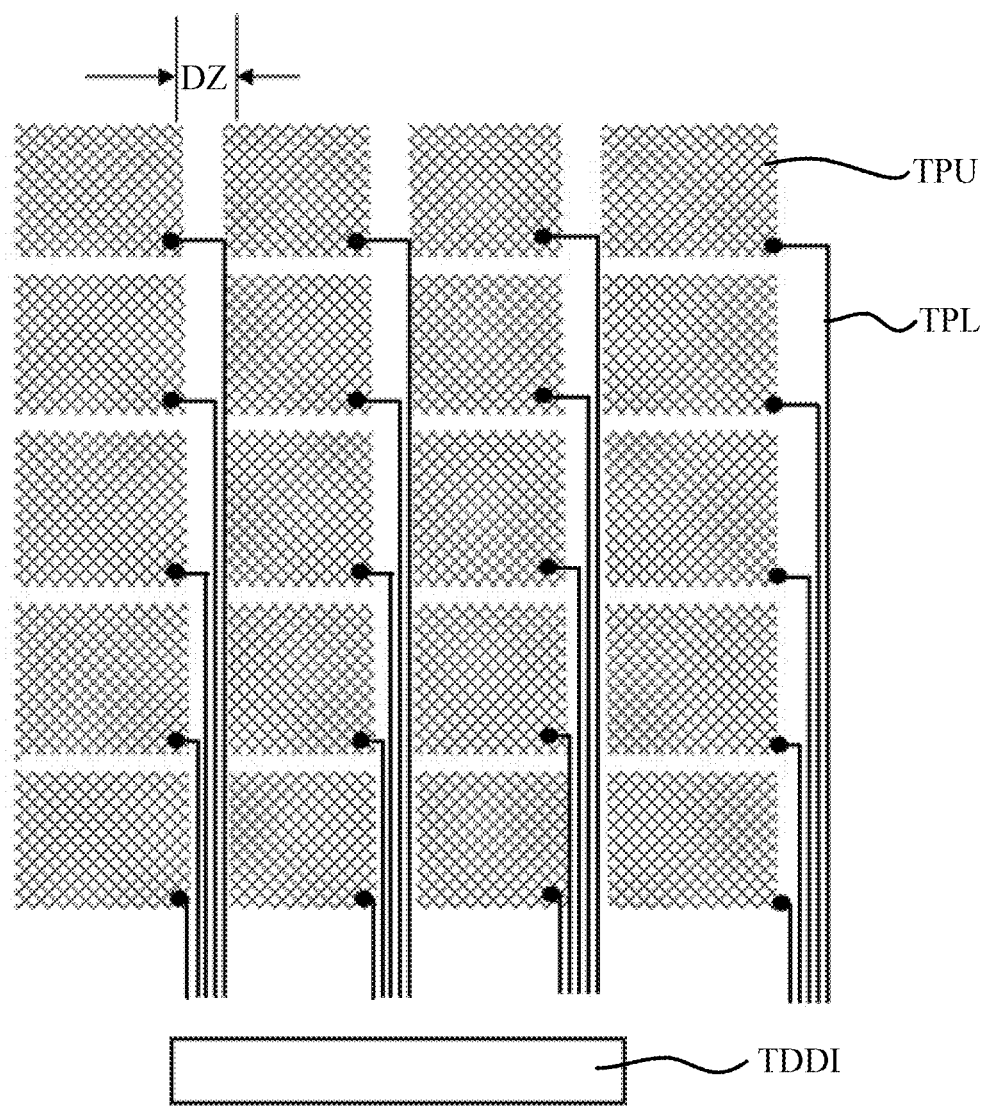
FIG. 2 is a schematic diagram of a second structure of the display panel provided by an embodiment of the present application.

Please refer to FIG. 1 to FIG. 13. As shown in FIG. 1 and FIG. 2, this embodiment provides a display panel, which includes a substrate, a touch test terminal TP, a multiplexing circuit MUX, a touch unit TPU, and a touch display chip TDDI. An input end of the multiplexing circuit MUX is correspondingly connected to a touch test terminal TP, a touch unit TPU is correspondingly connected to an output end of the multiplexing circuit MUX, a touch output pin of the touch display chip TDDI is correspondingly connected to a touch unit TPU, wherein the touch test terminal TP and the multiplexing circuit MUX are located between the substrate and the touch display chip TDDI.

It should be noted that in this embodiment, the touch display chip TDDI is a chip that integrates a touch chip and a source driver chip.

It can be understood that, in this embodiment, the touch test terminal TP and the multiplexing circuit MUX are located between the substrate and the touch display chip TDDI. Such a positional relationship can reduce the number of traces connecting the touch unit TPU to the touch test terminal TP through the multiplexing circuit MUX before the touch display chip TDDI is bonded, and extend all the traces of the touch unit TPU to the touch test terminal TP, to facilitate touch test. Meanwhile, the use of the multiplexing circuit MUX reduces the number of touch test terminals TP used, and can save the space occupied by the frame.

In one embodiment, at least one row of input terminals IP is provided on the substrate, and at least three rows of output terminals OP are provided on the substrate.

It can be understood that on the substrate, the number of output terminals OP is more than the number of input terminals IP, and the input terminals IP or output terminals OP are distributed on the substrate in rows. The output terminal OP of each column presents a certain inclination, and the two adjacent output terminals OP in the same column have a certain displacement in the row direction. In the case of the same area, it is beneficial to arrange more output terminals OP. Meanwhile, the facing area between two output terminals OP can be reduced, so the interference generated by the coupling circuit can be reduced.

In one embodiment, the touch display chip TDDI includes N touch output groups TG, where one touch output group TG includes a plurality of touch output pins. The distance between two adjacent touch output pins is defined as a first distance, and a distance between two adjacent touch output groups TG is defined as a second distance, wherein the first distance is less than the second distance. A multiplexing sub-circuit SMUX is vertically opposite to a touch output group TG, wherein N is an integer greater than or equal to 2.

It needs to be explained that a multiplexing sub-circuit SMUX is vertically opposite to a touch output group TG. Compared with the touch output group TG, the multiplexing sub-circuit SMUX is closer to the substrate in the thickness direction (i.e., the direction perpendicular to the display panel) of the display panel. Meanwhile, a touch output group TG is located directly above a multiplexing sub-circuit SMUX. In this embodiment, such a positional relationship can not only meet the connection requirements of the wiring to the touch unit TPU but also reduce unnecessary winding arrangements, which meet the connection requirements with the shortest distance and save frame space.

In one embodiment, the touch display chip TDDI includes input pins, a main body of the touch display chip, and touch output pins. The input pins and the touch output pins are respectively located on two opposite sides of the main body of the touch display chip. The display panel further includes input terminal IP and output terminal OP. An input pin is connected to an input terminal IP, and a touch output pin is connected to an output terminal OP, wherein the touch test terminal TP and the multiplexing circuit MUX are located between the input terminal IP and the output terminal OP.

It should be noted that the shape of the touch display chip TDDI may be a rectangle, and the rectangle has two opposite long sides and two opposite short sides. The input pin is located on one of the sides where the two long sides are located, and the touch output pin is located on the other of the sides where the two long sides are located. The input pin faces an edge of the frame area NA, and the touch output pin faces the display area AA, which is beneficial to transmit the input signal from outside of the display panel to the input pin. For example, the input signal can be a data signal. Meanwhile, the touch output pin is wired to the touch unit TPU through the output terminal OP, which is beneficial to realize the wiring to the display area AA with a short distance. It can be understood that from the frame area NA to the display area AA, the input terminal IP, the touch test terminal TP, the multiplexing circuit MUX, and the output terminal OP are sequentially distributed. Such a layout is conducive to realize the shortest distance wiring between two adjacent objects.

In one embodiment, the touch display chip TDDI further includes display output pins arranged on the same side of the touch output pins, where the display output pins are distributed between the touch output groups TG, and a display output pin is connected to an output terminal OP.

It should be noted that, in this embodiment, the output pins of the touch display chip TDDI at least include touch output pins and display output pins located on the same long side, wherein the display output pins are also distributed in groups, and a display output group DG includes at least one display output pin and the touch output group TG alternately distributed. The display output group DG and the touch output group TG are alternately distributed, so that there is more space to arrange the touch test terminals TP corresponding to the touch output group TG, which provides a more suitable space for touch testing. For example, the distance between the touch test terminals TP can be increased to facilitate the pressing of the thimble.

As shown in FIG. 1, in one embodiment, the display panel includes a display area AA and a frame area NA. The frame area NA includes a bending area BA, where the bending area BA is close to the display area AA. The display panel further includes a touch line TPL group and a data line group. The touch line TPL group includes touch traces, where a touch trace is correspondingly connected to a touch output pin or an output terminal OP. The data line group includes data traces, where a data trace is correspondingly connected to a display output pin or an output terminal OP, and the touch line TPL group and the data line group are alternately distributed in sequence. The touch line TPL group and the data line group are located on one side of the bending area BA and away from the display area AA.

In one embodiment, the display panel further includes power supply line group PG, where the power supply line group PG includes power supply traces. The power supply line group PG is located between adjacent touch line group TPL and the data line group.

It should be noted that the power supply traces include at least one of a constant voltage high potential signal trace or a constant voltage low potential signal trace.

In one embodiment, the display panel further includes touch lines TPL. A touch line TPL is connected to a touch trace and a touch unit TPU, wherein the touch lines TPL are equally spaced in the display area AA and two ends of each of the touch lines are aligned with each other. It is understandable that the touch lines TPL are equally spaced in the display area AA and two ends of each of the touch lines are aligned with each other is beneficial to achieve equal impedance between different touch lines TPL and reduce the asynchrony of signal transmission, and it is beneficial to realize the balanced distribution of coupling capacitance between different touch lines TPL, and reduce the interference to signal transmission.

As shown in FIG. 2, in one embodiment, the touch unit TPU includes touch electrodes arranged in the first metal layer, and the touch line TPL is located in the first metal layer and connected to the touch electrode. In this embodiment, a part of the touch line TPL is located between two adjacent rows of touch electrodes. The space between the touch electrodes in two adjacent columns is defined as a touch blind zone DZ.

It should be noted that, in this embodiment, the touch line TPL and the touch electrode are both located on the first metal layer, which can reduce the thickness of the display panel. The touch electrode can be a metal grid, and the touch line TPL can be integrally formed by etching, which is beneficial to reduce process steps.

Figure 3:
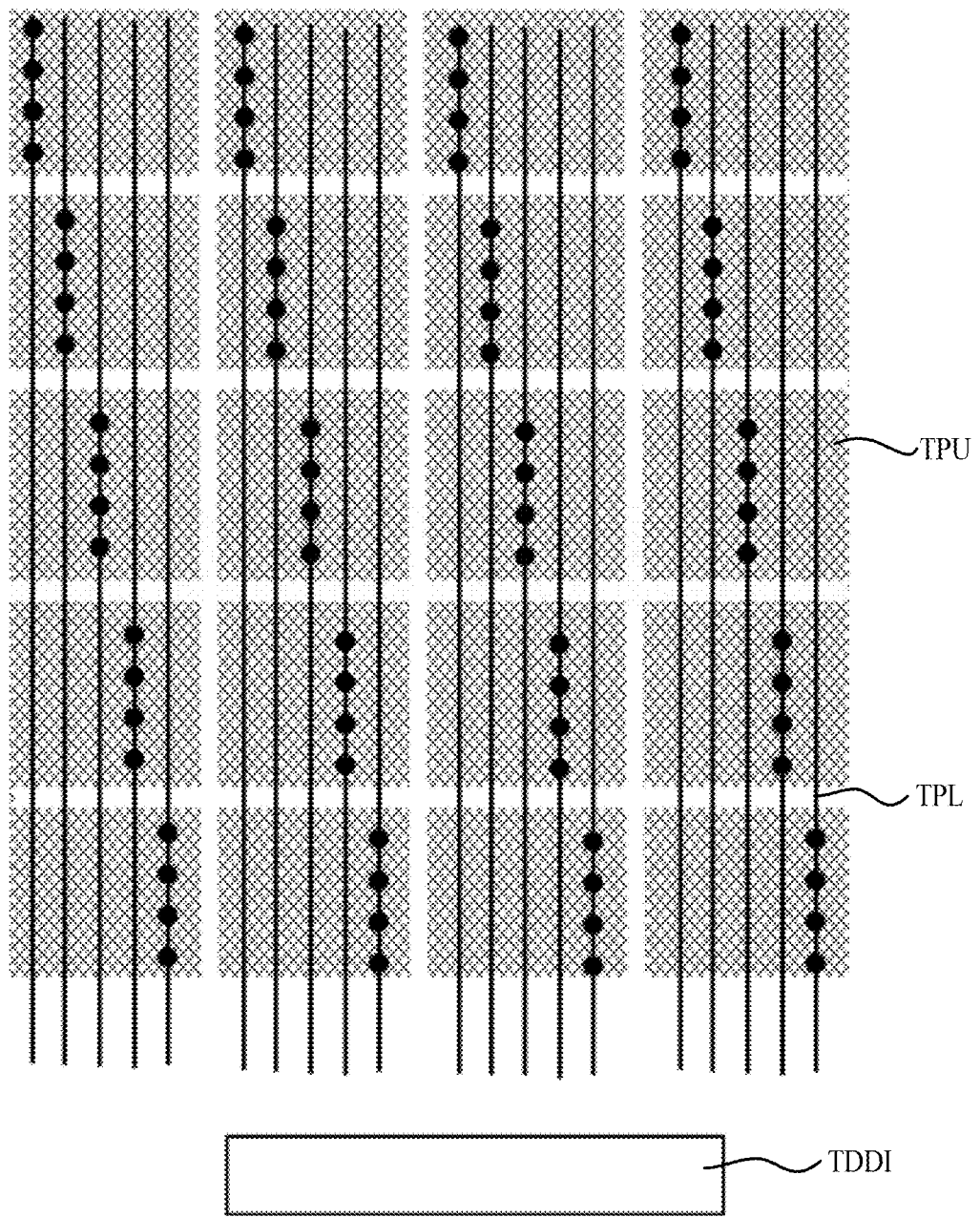
FIG. 3 is a schematic diagram of a third structure of the display panel provided by an embodiment of the present application.

As shown in FIG. 3, in one embodiment, the touch unit TPU includes a first metal layer provided with touch electrodes, a second metal layer provided with a touch line TPL, and an insulating layer between the first metal layer and the second metal layer. Via holes are formed between the first metal layer and the second metal layer, and a touch electrode is connected to a touch line TPL through at least one via hole. Wherein, in the direction perpendicular to the display panel, the touch electrode is located on one side of the touch line TPL.

Figure 4:
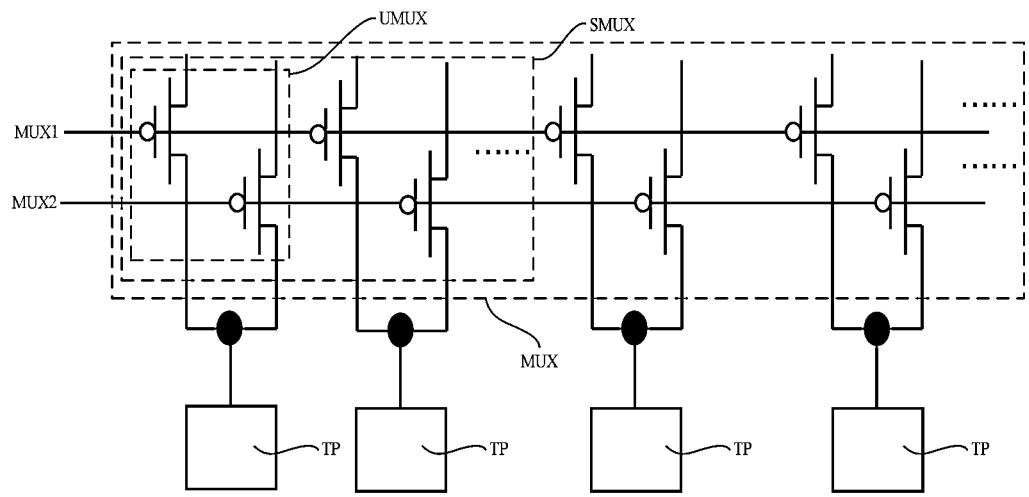
FIG. 4 is a schematic diagram of a first structure of a multiplexing circuit provided by an embodiment of the present application.

As shown in FIG. 4, in one embodiment, the multiplexing circuit MUX includes N multiplexing sub-circuits SMUX. The multiplexing sub-circuit SMUX includes multiple multiplexing units UMUXs. An input terminal of a multiplexing unit UMUX is correspondingly connected to a touch test terminal TP.

Each multiplexing unit UMUX may include but is not limited to two thin-film transistors, where one touch test terminal TP is connected to the input ends of two thin-film transistors. The first multiplexing signal MUX1 and the second multiplexing signal MUX2 respectively control the turn-on and turn-off of the two thin-film transistors in a time-sharing manner to meet the requirements of touch testing.

In one embodiment, the display panel further includes a multiplexing signal line and a multiplexing test terminal; the multiplexing signal line is electrically connected to a gate of a corresponding thin-film transistor in the multiplexing circuit, and one multiplexing signal line is connected to at least one multiplexing test terminal. Wherein, the multiplexing test terminal can be, but is not limited to, used to access a corresponding multiplexing signal, and then transmit the multiplexing signal to a gate of a corresponding thin-film transistor through the multiplexing signal line.

Specifically, the multiplexing test terminal can be, but is not limited to, located on one side of the thin-film transistor, and can also be located on both outer sides of all thin-film transistors in the multiplexing circuit MUX. That is, the multiplexing test terminals are located close to the two ends of the multiplexing signal line. This is beneficial to access the corresponding multiplexing signal.

It can be understood that, in this embodiment, the number of TFT switches of the multiplexing unit UMUX is 2. That is, the input/output ratio of the multiplexing circuit MUX is 1:2. If there are 800 touch units TPU, after the 1:2 conversion of the multiplexing circuit MUX, only 400 touch test terminals TP are needed. If the touch output group TG of the touch display chip TDDI is divided into 10, then only 40 touch test terminals TP need to be provided on the corresponding substrate below each touch output group TG. It greatly reduces the number of touch test terminals TP used, reduces space occupation, and facilitates touch testing.

Figure 5:
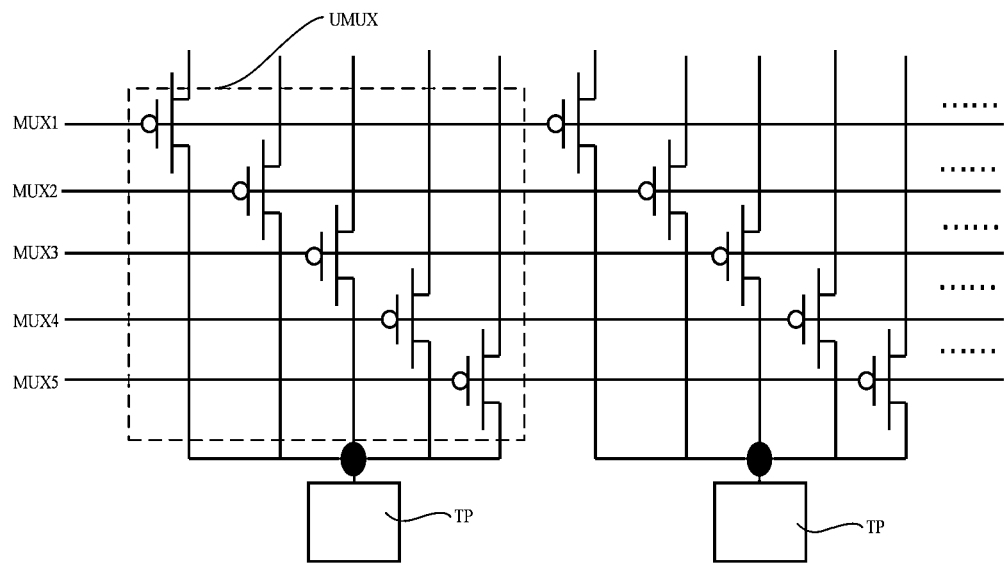
FIG. 5 is a schematic diagram of a second structure of the multiplexing circuit provided by an embodiment of the present application.

As shown in FIG. 5, each multiplexing unit UMUX may further include five thin-film transistors. One touch test terminal TP is connected to the input end of five thin-film transistors. The first multiplexing signal MUX1, the second multiplexing signal MUX2, the third multiplexing signal MUX3, the fourth multiplexing signal MUX4, and the fifth multiplexing signal MUX5 correspondingly control turn-on and turn-off of the five thin-film transistors in a time-sharing manner to meet the requirements of touch testing.

It can be understood that, in this embodiment, the number of TFT switches of the multiplexing unit UMUX is 5. That is, the input/output ratio of the multiplexing circuit MUX is 1:5. If there are 800 touch units TPU, only 160 touch test terminals TP are needed after the 1:5 conversion of the multiplexing circuit MUX. If the touch output group TG of the touch display chip TDDI is divided into 10, then only 16 touch test terminals TP need to be provided on the corresponding substrate below each touch output group TG. It greatly reduces the number of touch test terminals TP used, reduces space occupation, and facilitates touch testing.

Figure 6:
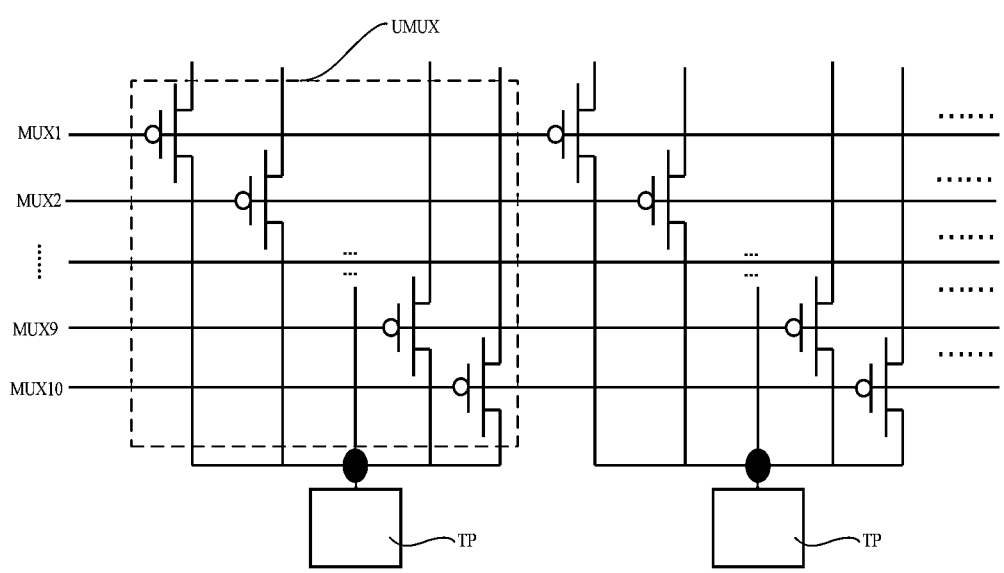
FIG. 6 is a schematic diagram of a third structure of the multiplexing circuit provided by an embodiment of the present application.

As shown in FIG. 6, each multiplexing unit UMUX may further include ten thin-film transistors. One touch test terminal TP is connected to the input end of ten thin-film transistors, where the first multiplexing signal MUX1, the second multiplexing signal MUX2 to the ninth multiplexing signal MUX9, and the tenth multiplexing signal MUX10 correspondingly control turn-on and turn-off of the five thin-film transistors in a time-sharing manner, to meet the requirements of touch testing.

It can be understood that, in this embodiment, the number of TFT switches of the multiplexing unit UMUX is 10. That is, the input/output ratio of the multiplexing circuit MUX is 1:10. If there are 800 touch units TPU, after the 1:10 conversion of the multiplexing circuit MUX, only 80 touch test terminals TP are needed. If the touch output group TG of the touch display chip TDDI is divided into 10, then only 8 touch test terminals TP need to be provided on the corresponding substrate below each touch output group TG. It greatly reduces the number of touch test terminals TP used, reduces space occupation, and facilitates touch testing.

It should be noted that a multiplexing sub-circuit SMUX can be, but is not limited to, include multiple multiplexing units UMUX, or include at least one multiplexing unit UMUX. The input/output ratio of the multiplexing unit UMUX can be 1:2 to 1:10; the multiplexing unit UMUX can also have one input terminal corresponding to at least eleven output terminals. It is understandable that the use of the multiplexing unit UMUX can greatly reduce the number of traces between the touch test terminal TP and the corresponding touch unit TPU. Meanwhile, it is beneficial to extend all the traces of the touch unit TPU to the corresponding touch test terminal TP.

Figure 7:
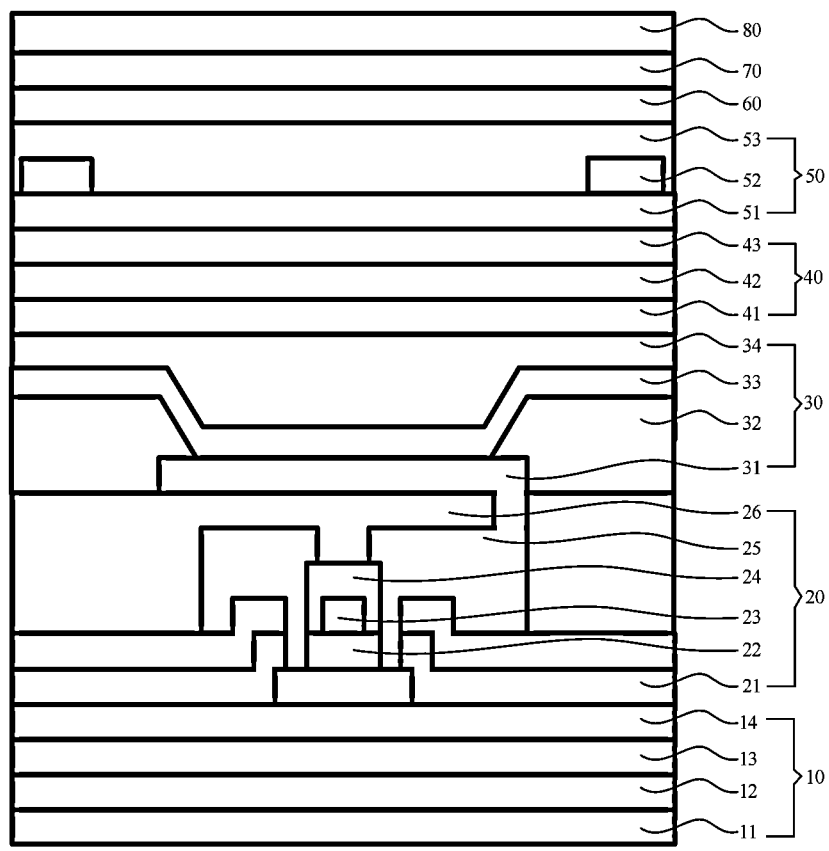
FIG. 7 is a schematic diagram of a fourth structure of the display panel provided by an embodiment of the present application.

As shown in FIG. 7, the display panel may further include a polyimide (PI) substrate layer 10, a thin film transistor layer 20, an organic light-emitting functional layer 30, a thin-film encapsulation layer 40, a touch functional layer 50, a polarizing layer 60, an optical adhesive layer 70, and a cover 80 which are sequentially stacked.

The PI substrate layer 10 includes a protective film 11, a substrate 12, a barrier layer 13, and a first buffer layer 14 which are sequentially stacked, where the substrate 12 is a double-layer PI design. The material of the barrier layer 13 and the first buffer layer 14 can be but is not limited to silicon nitride, and silicon oxide may also be used.

The thin-film transistor layer 20 includes an active layer 21, a gate insulating layer 22, a gate layer 23, an interlayer insulating layer 24, a source and drain layer 25, and a second buffer layer 26 that are sequentially stacked. The organic light-emitting functional layer 30 includes an anode layer 31, a pixel defining layer 32, an organic light-emitting layer 33, and a cathode layer 34 that are sequentially stacked.

The thin-film encapsulation layer 40 includes a first inorganic layer 41, an organic material layer 42, and a second inorganic layer 43 that are sequentially stacked. Wherein, both the first inorganic layer 41 and the second inorganic layer 43 can be formed by a chemical vapor deposition process. The organic material layer 42 can be formed by printing technology.

In one embodiment, the touch functional layer 50 includes a third buffer layer 51, a first metal layer 52, and a passivation layer 53 that are sequentially stacked. Wherein, the first metal layer 52 includes a touch unit TPU and a touch line TPL.

Figure 8:
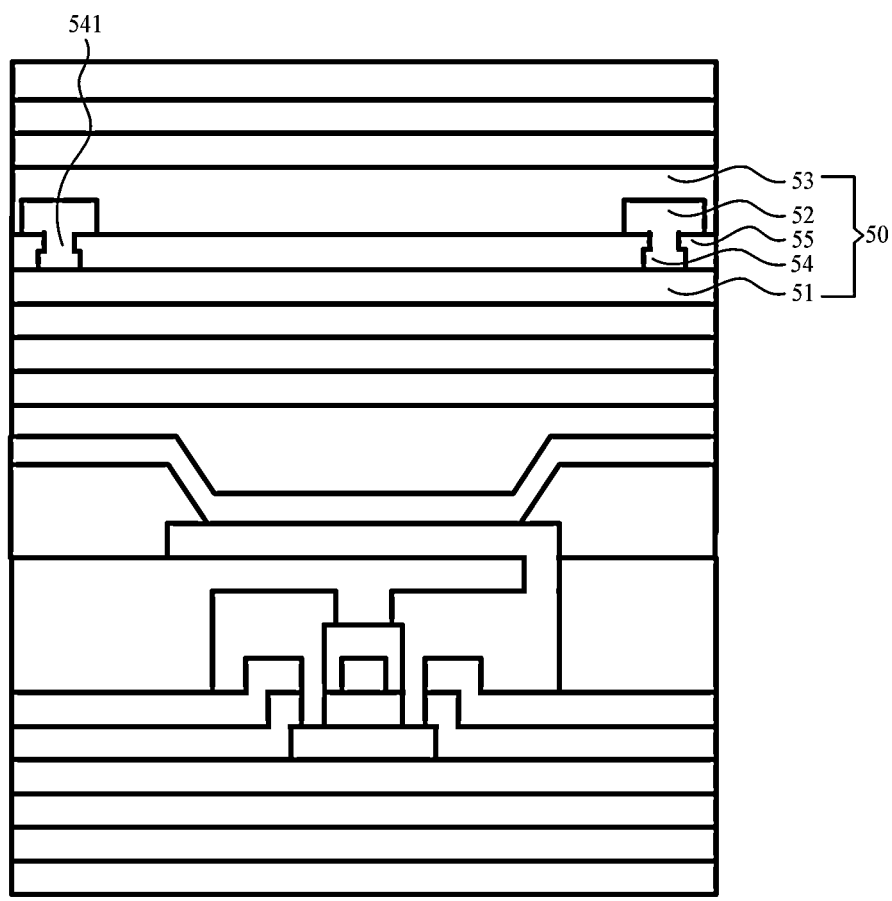
FIG. 8 is a schematic diagram of a fifth structure of the display panel provided by an embodiment of the present application.

As shown in FIG. 8, in one embodiment, the touch functional layer 50 includes a third buffer layer 51, a second metal layer 54, an insulating layer 55, a first metal layer 52, and a passivation layer 53 which are sequentially stacked. Wherein, the first metal layer 52 includes touch units TPU distributed in an array. The second metal layer 54 includes a touch line TPL. A touch unit TPU is correspondingly connected to a touch line TPL through at least one via hole 541.

Figure 9:
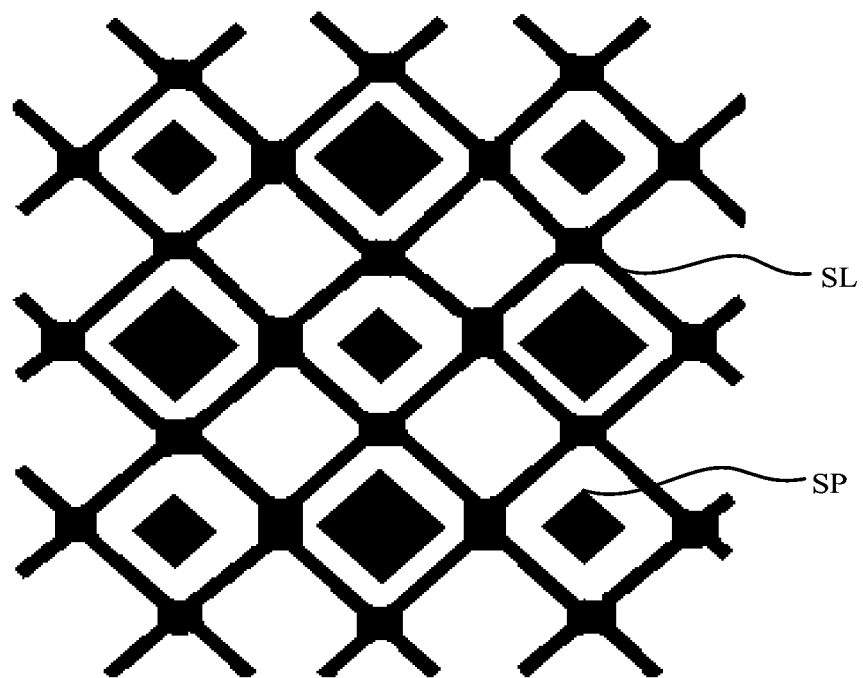
FIG. 9 is a first structural schematic diagram of a correspondence between sub-pixels and touch electrodes or touch lines provided by an embodiment of the present application.

As shown in FIG. 9, in one embodiment, the display panel further includes a plurality of sub-pixels SP and touch metal lines SL. Wherein, the touch metal wire SL can be a touch electrode or a touch line TPL. If the sub-pixel SP has a square or other polygonal structure, the touch electrodes or touch lines TPL formed around the sub-pixel SP are arranged in a corresponding linear shape. The polyline-shaped touch electrode or touch line TPL surrounding the sub-pixel SP avoids the sub-pixel SP below.

Figure 10:
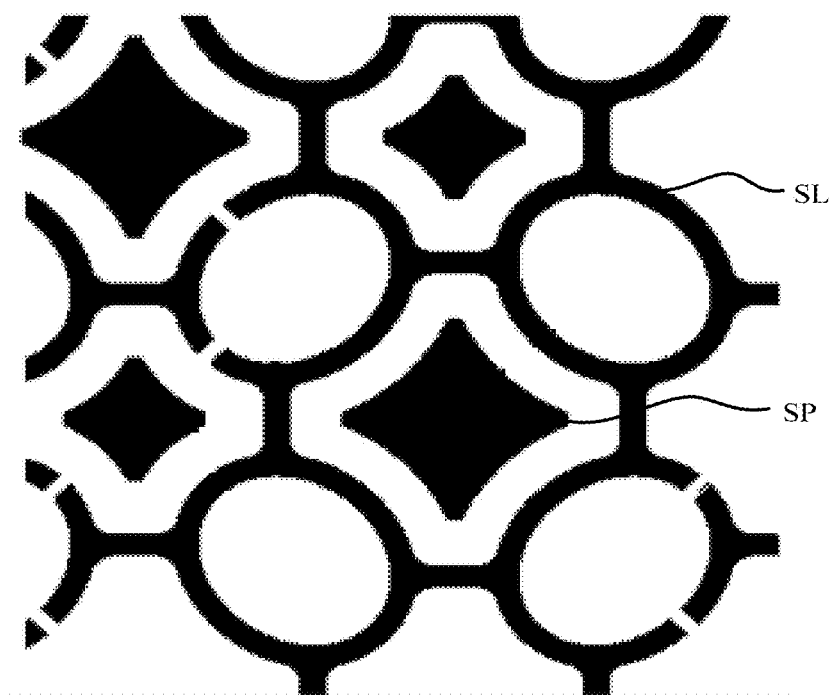
FIG. 10 is a second structural schematic diagram of the correspondence between sub-pixels and touch electrodes or touch lines provided by an embodiment of the present application.

As shown in FIG. 10, in one embodiment, if the sub-pixel SP has an elliptical or other arc-shaped structure, then the touch electrodes or touch lines TPL formed around the sub-pixels SP are arranged in a corresponding arc shape. The polyline-shaped touch electrode or touch line TPL surrounding the sub-pixel SP avoids the sub-pixel SP below.

Figure 11:
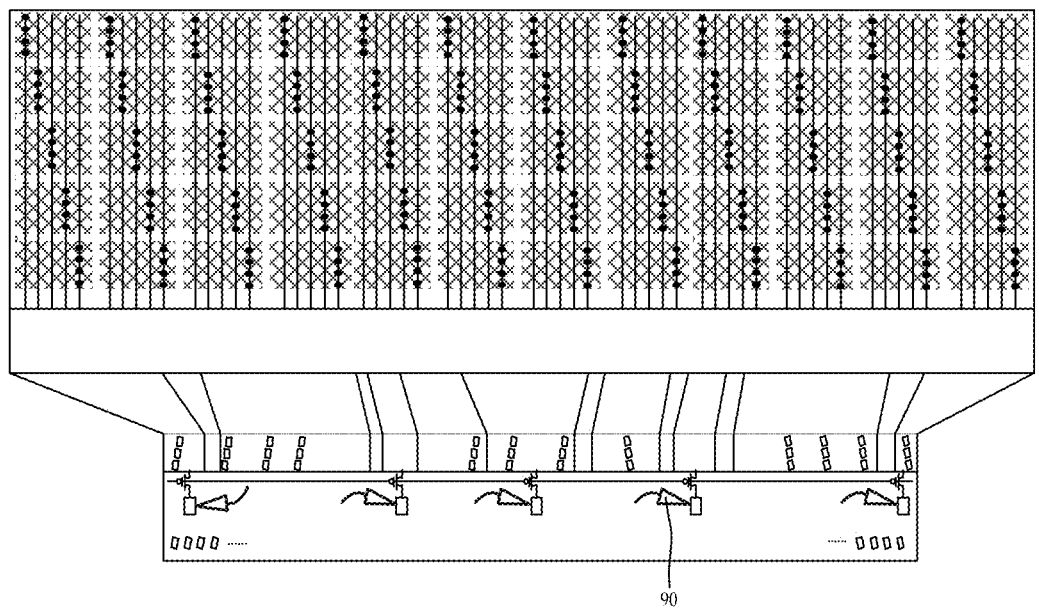
FIG. 11 is a schematic diagram of structures of a thimble and a touch test terminal provided by an embodiment of the present application.
Figure 12:
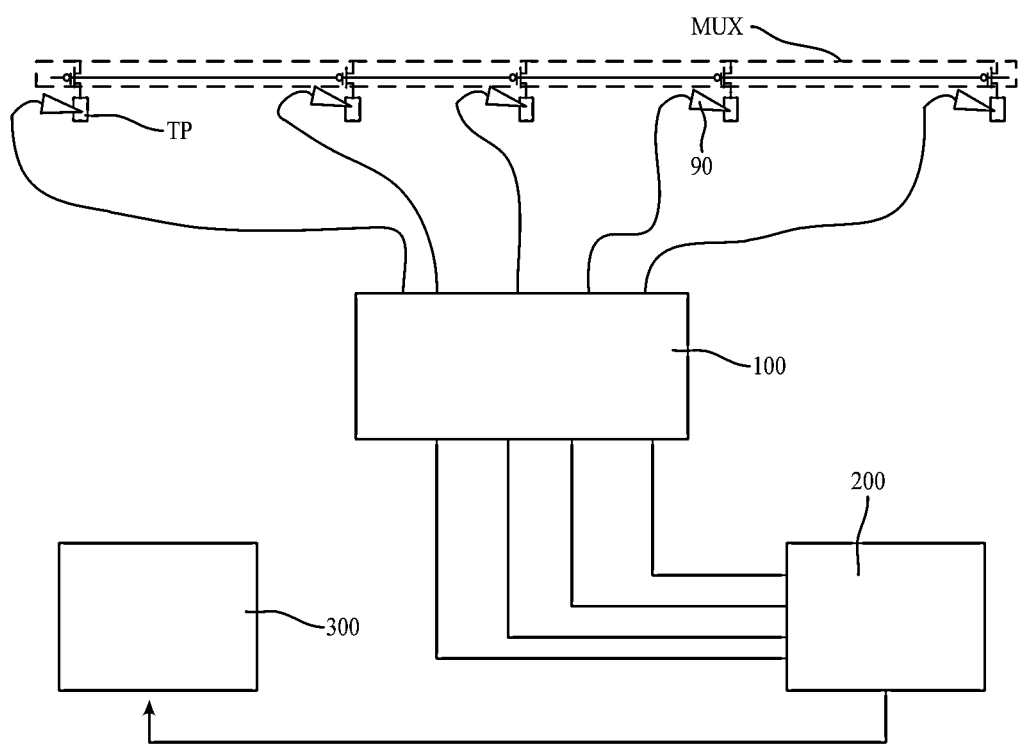
FIG. 12 is a schematic structural diagram of a touch test provided by an embodiment of the present application.
Figure 13:
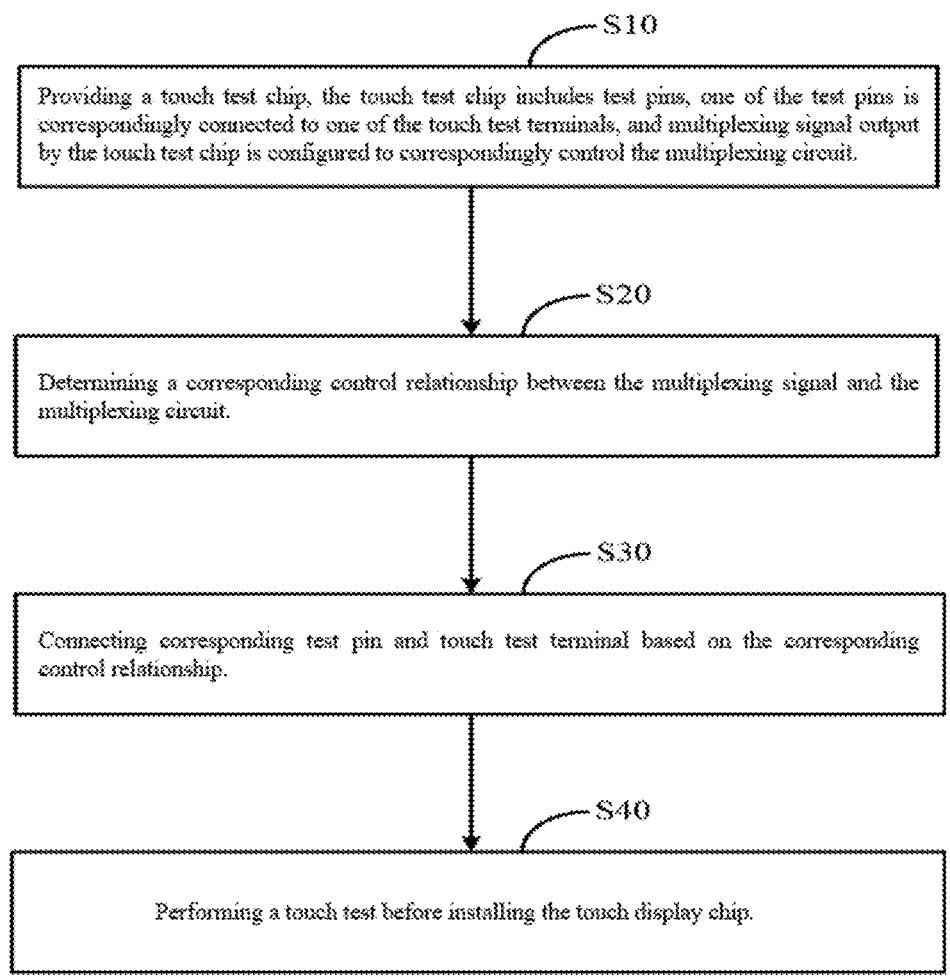
FIG. 13 is a schematic diagram of a touch test process provided by an embodiment of the present application.

As shown in FIG. 11 to FIG. 13, in one embodiment, the present application provides a touch test method for a display panel in any of the above embodiments, which includes following steps:

Step S10: providing a touch test chip, the touch test chip includes test pins, one of the test pins is correspondingly connected to one of the touch test terminals, wherein multiplexing signal output by the touch test chip is configured to correspondingly control the multiplexing circuit.

Step S20: determining a corresponding control relationship between the multiplexing signal and the multiplexing circuit.

Step S30: connecting the corresponding one of the test pins and one of the touch test terminals based on the corresponding control relationship.

Step S40: performing a touch test before installing the touch display chip.

Specifically, as shown in FIG. 11 and FIG. 12, the touch test instrument 200 is connected to the input end of the touch test chip 100 and the server 300. The test pins of the touch test chip 100 are connected to the thimble 90 through a connecting line. Then the thimble 90 is pressed on the touch test terminal TP, and the touch test terminal TP is connected to the input end of the multiplexing circuit MUX correspondingly. The touch test process is completed under the control of the touch test instrument 200, and the result is fed back to server 300. The touch test process can be completed at one time or multiple times. It should be noted that the touch test chip 100 in this embodiment has a multiplexing function corresponding to the multiplexing circuit MUX, which can reduce the number of test pins and reduce the cost of the touch test chip 100. The multiplexing signal is used to control the transistor in the corresponding multiplexing unit UMUX to turn on or turn off.

In one embodiment, the present application provides an electronic device, which includes the display panel in any of the above embodiments.

It is understandable that for those of ordinary skill in the art, equivalent replacements or changes can be made according to the technical solution of the present application and its inventive concept. All these changes or replacements shall fall within the protection scope of the claims of this application.

What is claimed is:

1. A display panel, comprising:
   a substrate;
   touch test terminals;
   a multiplexing circuit, wherein the multiplexing circuit comprises an input end correspondingly connected to one of the touch test terminals;
   touch units, wherein one of the touch units is correspondingly connected to an output end of the multiplexing circuit; and
   a touch display chip, wherein one of touch output pins of the touch display chip is correspondingly connected to one of the touch units;
   wherein, the touch test terminals and the multiplexing circuit are located between the substrate and the touch display chip, and the touch display chip at least partially overlaps the touch test terminals and the multiplexing circuit;
   wherein the touch display chip comprises N touch output groups, one of the touch output groups comprises a plurality of the touch output pins, a distance between two adjacent touch output pins is defined as a first distance, a distance between two adjacent touch output groups is defined as a second distance, and the first distance is less than the second distance;
   wherein the multiplexing circuit comprises N multiplexing sub-circuits, and one of the multiplexing sub-circuits is disposed vertically opposite to one of the touch output groups; and
   wherein N is an integer greater than or equal to 2.

2. The display panel according to claim 1, wherein the multiplexing sub-circuits comprise a plurality of multiplexing units, and any of one of the plurality of multiplexing units comprises an input end connected to a corresponding one of the touch test terminals.

3. The display panel according to claim 2, wherein the touch display chip comprises input pins, a main body, and the touch output pins, and the input pins and the touch output pins are respectively located on two opposite sides of the main body of the touch display chip;
   wherein the display panel further comprises input terminals and output terminals, one of the input pins is connected to one of the input terminals, and one of the touch output pins is connected to one of the output terminals; and
   wherein the touch test terminals and the multiplexing circuit are located between the input terminals and the output terminals.

4. The display panel according to claim 3, wherein at least one row of the input terminals and at least three rows of the output terminals are disposed on the substrate.

5. The display panel according to claim 4, wherein the touch display chip further comprises display output pins provided on a same side as the touch output pins, and the display output pins are distributed between the touch output groups, and one of the display output pins is connected to one of the output terminals.

6. The display panel according to claim 5, wherein the display panel comprises a display area and a frame area, the frame area comprises a bending area, and the bending area is disposed close to the display area, and Wherein the display panel further comprises:
a touch line group comprising touch traces, wherein one of the touch traces is correspondingly connected to one of the touch output pins or one of the output terminals; and
a data line group comprising data lines, wherein one of the data lines is correspondingly connected to one of the display output pins or one of the output terminals;
wherein the touch line group and the data line group are alternately distributed in sequence, and the touch line group and the data line group are located on one side of the bending area away from the display area.

7. The display panel according to claim 6, further comprising:
power supply line groups comprising power supply traces, wherein one of the power supply line groups is located between the touch line group and the data line group adjacent to the touch line group.

8. The display panel according to claim 6, further comprising touch lines, wherein one of the touch lines is connected to one of the touch traces and one of the touch units; and
wherein the touch lines are equally spaced in the display area and two ends of each of the touch lines are aligned with each other.

9. The display panel according to claim 8, wherein each of the touch units comprise touch electrodes disposed on a first metal layer, and the touch lines are disposed on the first metal layer and connected to the touch electrodes; or
each of the touch units comprise a first metal layer provided with touch electrodes, a second metal layer provided with the touch lines, and an insulating layer located between the first metal layer and the second metal layer; and wherein via holes are formed between the first metal layer and the second metal layer, and one of the touch electrodes is connected to one of the touch lines through at least one of the via holes.

10. The display panel according to claim 1, further comprising:
multiplexing signal lines, wherein each of the multiplexing signal lines is electrically connected to a gate of a corresponding one of thin-film transistors in the multiplexing circuit; and
multiplexing test terminals, wherein one of the multiplexing signal lines is connected to at least one of the multiplexing test terminals.

11. The display panel according to claim 10, wherein each of the multiplexing test terminals is located on one side of one of the thin-film transistors.

12. A touch test method of the display panel according to claim 1, comprising:

providing a touch test chip, wherein the touch test chip comprises test pins, one of the test pins is correspondingly connected to one of the touch test terminals, and multiplexing signal output by the touch test chip is configured to correspondingly control the multiplexing circuit;
determining a corresponding control relationship between the multiplexing signal and the multiplexing circuit;
connecting a corresponding one of the test pins and one of the touch test terminals based on the corresponding control relationship; and
performing a touch test before installing the touch display chip.

13. An electronic device, comprising the display panel of claim 1.

14. The electronic device according to claim 13, wherein the display panel further comprises a polyimide substrate layer, a thin film transistor layer, an organic light-emitting functional layer, a thin film encapsulation layer, a touch functional layer, a polarizing layer, an optical adhesive layer, and a cover plate that are stacked in sequence.

15. The electronic device according to claim 14, wherein the multiplexing sub-circuits comprise a plurality of multiplexing units, and an input end of one of the plurality of multiplexing units is connected to a corresponding one of the touch test terminals.

16. The electronic device according to claim 15, wherein the touch display chip comprises input pins, a main body, and the touch output pins; the input pins and the touch output pins are respectively located on two opposite sides of the main body of the touch display chip;
wherein the display panel further comprises input terminals and output terminals, one of the input pins is connected to one of the input terminals, and one of the touch output pins is connected to one of the output terminals; and
wherein the touch test terminals and the multiplexing circuit are located between the input terminals and the output terminals.

17. The electronic device according to claim 16, wherein at least one row of the input terminals and at least three rows of the output terminals are disposed on the substrate.

18. The electronic device according to claim 17, wherein the touch display chip further comprises display output pins provided on a same side as the touch output pins, and the display output pins are distributed between the touch output groups, wherein one of the display output pins is connected to one of the output terminals.

* * * * *